United States Patent [19]

Malpass

[11] Patent Number: 4,657,998

[45] Date of Patent: Apr. 14, 1987

[54] POLYETHYLENE WITH BROAD MOLECULAR WEIGHT DISTRIBUTION

[75] Inventor: Dennis B. Malpass, LaPorte, Tex.

[73] Assignee: Exxon Research & Engineering Co., Florham Park, N.J.

[21] Appl. No.: 840,189

[22] Filed: Mar. 17, 1986

Related U.S. Application Data

[62] Division of Ser. No. 528,185, Aug. 31, 1983, Pat. No. 4,593,010.

[51] Int. Cl.$^4$ .......................... C08F 4/62; C08F 4/64; C08F 4/68

[52] U.S. Cl. ..................... 526/144; 526/352

[58] Field of Search ................. 526/144, 352

[56] References Cited

U.S. PATENT DOCUMENTS 3,899,477 8/1975 Altemore et al. .............. 526/352 X
4,004,071 1/1977 Aishima et al. ................. 526/144 X Primary Examiner—Patrick P. Garvin
Attorney, Agent, or Firm—M. B. Kurtzman

[57] ABSTRACT

Catalyst system comprising titanium containing catalyst component, isoprenylaluminum and a halohydrocarbon for the production of polyethylene having a broad molecular weight distribution.

2 Claims, No Drawings

POLYETHYLENE WITH BROAD MOLECULAR WEIGHT DISTRIBUTION

This is a division of application Ser. No. 528,185, filed Aug. 31, 1983 and now U.S. Pat. No. 4,593,010.

BACKGROUND OF THE INVENTION

1. Field of the Invention

This invention relates to novel catalysts for the polymerization of olefins. The invention especially relates to a process for the production of polyolefins having a broad molecular weight distribution characterized in that a cocatalyst comprising isoprenylaluminum and a halogenated hydrocarbon is used together with a transition metal compound of Groups IVb to VIb of the Periodic Table (56th Edition of Handbook of Chemistry and Physics, CRC Press 1975). More particularly, the invention is concerned with the cocatalyst comprising isoprenylaluminum and a halogenated hydrocarbon which is employed together with a catalyst comprising a transition metal compound of a Group IVb to VIb metal in a polymerization process for the production of polyethylene having a broad molecular weight distribution.

2. Description of the Prior Art

It is known that the molecular weight of polyethylene may be controlled by the addition of a controlled amount of a haloalkane to a catalyst system comprising a catalyst of a compound of a metal of Groups IVb, Vb and VIb and an organometallic compound of an alkali metal, alkaline earth metal, zinc, earth metal and especially aluminum. For example, Vandenberg in U.S. Pat. No. 3,354,139, issued Nov. 21, 1967, discloses the use of haloalkanes in combination with a transition metal compound and an organoaluminum compound. Favis discloses in U.S. Pat. No. 3,472,910 that tertiary alkyl halides and alkyl halocyclopentanes can be usefully employed in combination with a Ziegler-type catalyst in order to obtain a low molecular weight liquid linear alpha-olefin product.

Halohydrocarbons have been employed for improving tacticity of polymer product and activity of catalyst. In, for example, U.S. Pat. No. 3,432,513 of Miller et al, issued Mar. 11, 1969, it is disclosed that certain halogenated hydrocarbons can be usefully employed in combination with a Ziegler-type catalyst comprising an organoaluminum compound and a titanium metal halide for the production of highly isotactic polypropylene. Each of U.S. Pat. Nos. 4,182,691, 4,183,826, and 4,242,230 of Ueno et al discloses an improved titanium trichloride containing catalyst system obtained by treating a titanium trichloride produced by reducing titanium tetrachloride with an organo-metal compound and contacting the resulting reduced solid product with a chlorinated saturated hydrocarbon. The obtained titanium trichloride complex is usefully employed with an organoaluminum cocatalyst for the polymerization of alpha-olefins. Lowery et al in U.S. Pat. No. 4,250,288, issued Feb. 10, 1981, discloses a catalyst system exhibiting high catalytic activity in the polymerization of alpha-olefins, said catalyst system comprising a transition metal compound such as, tetra(isopropoxy)-titanium and an organomagnesium component such as a hydrocarbon soluble complex of dialkyl magnesium and an alkyl aluminum and an active hydrocarbyl halide.

Each of U.S. Pat. Nos. 4,004,071, 3,989,878, 4,159,965 and 4,027,089, assigned to Asahi Kasei Kogyo Kabushiki, discloses ethylene polymerization catalysts comprising the reaction product obtained by contacting a titanium compound with a hydrocarbon-soluble organomagnesium-aluminum complex and an organoaluminum compound cocatalyst. The patentees teach that in order to control the molecular weight of the obtained polymer it is possible to add, among others, a halohydrocarbon or hydrogen to the reaction system.

In U.S. Pat. No. 4,355,143 of Lassalle et al, molecular weight distribution is controlled through the use of halogenated ethylenic hydrocarbons as a catalyst modifier.

It is known that olefin polymerization catalysts comprising titanium as the primary active polymerization cite yield resins which have a narrow molecular weight distribution ($M_w/M_n$ less than about 10). For many applications of polyethylene it is important to improve the toughness properties of the processed polymer. A method of achieving this increase in toughness is accomplished by preparing polymers of high molecular weight (low melt index). There is however at these high molecular weight values, a corresponding decrease in rheological properties. The decrease in rheological properties can be compensated for by broadening the molecular weight distribution of the polymer in order to improve processing characteristics.

For example, polyethylene having a broad molecular weight distribution is adavantageously processed during the extrusion process, and in blow molding, polyethylene having a broad molecular weight distribution obtains an extruded product of increased strength.

In view of the foregoing problems encountered in the use of Ziegler catalysts, it would be highly desirable to provide a polymerization catalyst which produces polyolefins and particularly polyethylene with high molecular weight and broad molecular weight distribution.

SUMMARY OF THE INVENTION

It is an object of this invention to provide linear polyolefins, and particularly linear polyethylenes, having a high molecular weight and broad molecular weight distribution. The present invention, in one aspect, obtains polyolefins, particularly polyethylene, having a broad molecular weight distribution by polymerizing olefins such as ethylene in the presence of a catalyst system comprising a Group IVb to VIb transition metal compound, isoprenylaluminum and a halogenated hydrocarbon.

In a second aspect, the invention relates to a cocatalyst system comprising isoprenylaluminum and a halogenated hydrocarbon which cocatalyst system can be employed with a Group IVb to VIb transition metal compound to obtain a catalyst system usefully employed for the polymerization of olefins, and particularly ethylene, to polyolefins and especially polyethylene having a broad molecular weight distribution. It is a further aspect of this invention to provide a process for polymerizing an alpha-olefin under conditions characteristic of Ziegler polymerization, wherein the aforementioned catalyst system is employed.

Preferably, the catalyst system comprising the cocatalyst of this invention in combination with a titanium containing primary catalyst will be employed for the production of high density polyethylene. Nevertheless, the catalyst can be usefully employed for the production of low and medium density polyethylenes, linear low density polyethylene and ethylene/alpha-olefin copolymers.

DESCRIPTION OF THE PREFERRED EMBODIMENTS

The halogenated hydrocarbons which can be employed in accordance with the present invention are aliphatic, alicyclic and aromatic hydrocarbons having 1 to 10 carbon atoms which are substituted with halogen. Preferably, the halogenated hydrocarbons are selected with polar halogenated hydrocarbons. The hydrocarbon may be partly or fully substituted by a halogen. When fully substituted, it is preferable that at least two different halogens be employed thereby providing increased polarity in the molecule. The halogens which may be usefully employed include fluorine, chlorine, bromine, and iodine.

Illustrative examples of the monohalogenated hydrocarbons represented by the general formula RX, wherein R is an alkynyl, alkenyl, alkyl, aryl, cycloalkenyl, cycloalkyl radical and combinations thereof, such as aralkyl and the like, include: methyl chloride, n-butylbromide, n-pentylchloride, n-dodecylchloride, cyclohexylchloride, ethylchloride, n-butylchloride, chlorobenzene, chloronaphthalene, benzylchloride, bromobenzene, fluorotoluene, chlorotoluene, bromotoluene, and the like. Illustrative, but nonlimiting examples of dihalohydrocarbons are, dichlorobenzene, dibromobenzene, dichloromethane and 1,2-dibromoethane. Illustrative but non-limiting examples of a fully substituted halogenated hydrocarbon which can be usefully employed in accordance with this invention is fluorotrichloromethane, dichlorodifluoromethane and trifluorochloromethane. Illustrative of the unsaturated halogenated hydrocarbons are vinyl chloride, vinylidene chloride, 1,2-cis-trichloroethylene, 1,2-trans-trichloroethylene, 1-chloroprene and 1,2-dichloroprene. Especially preferred halogenated hydrocarbons which can be usefully employed in accordance with this invention are dichloromethane, fluorotrichloromethane, ethyl chloride, n-butylchloride, chlorobenzene and fluorobenzene.

Of the suitable transition metal compounds, those most advantageously employed are the compounds of titanium, vanadium, and zirconium with those of titanium being most advantageous. The transition metal compounds can be the halides, oxyhalides, alkoxides, amides, acetylacetonates, alkyls, aryls, alkenyls, and alkadienyls. Of the foregoing transition metal compounds, the alkoxides and halides of titanium generally are most beneficial and preferably the halides of titanium.

Of the titanates, preferred are the trivalent and tetravalent titanium alkoxides or aryloxides, especially alkoxides having from 1 to 12 carbon atoms. Illustrative examples of the preferred titanates include: tetrabutoxytitanium, tetra(isopropoxy)titanium, diethoxytitanium bromide, dibutoxytitanium dichloride, n-butyl triisopropoxytitanium, ethyl dibutoxytitanium chloride, monoethoxytitanium trichloride, tetraethoxytitanium and the like. Of the preferred titanates, the tetravalent ones, wherein all halogen atoms are replaced by alkoxide, are most preferred with tetra(isopropoxy)titanium and tetrabutoxytitanium being especially preferred. Examples of other transition metal compounds which are advantageously employed are vanadium trichloride, vanadium tetrachloride, vanadium oxychloride, zirconium tetrachloride, titanocene dichloride, zirconium tetraalcoholates, such as tetrabutoxyzirconium, vanadium acetylacetonate and the like.

Most preferably, the transition metal compounds employed in accordance with this invention are the metal tetra and trivalent halides such as, for example, titanium tetrachloride, titanium trichloride, titanium tetrabromide, titanium tribromide and the like.

The transition metal compound can be employed as is, or the transition metal compound can be contained on a support or complexed with an organometallic compound. Illustrative of a particulate solid carrier include silica, silica-alumina, magnesia, magnesium carbonate, magnesium chloride, magnesium alkoxides, such as, magnesium methoxide, and the like. The ratio of titanium tetrahalide to carrier can vary from about 0.05:1 to about 1:1, and more preferably from about 0.1:1 to about 0.3:1.

Preferably, titanium tetrachloride is reacted with an organomagnesium compound or complex thereof, to obtain a highly precipitated solid. Illustrative organomagnesium compounds are for example $RMgX$, $R_2Mg$, $RMgOR$, $R_2Mg \cdot R_3Al$, $R_2Mg \cdot R_3B$, $R_2Mg \cdot R_2Zn$, $R_2Mg \cdot R_3Ga$ wherein R can be the same or different hydrocarbyl groups having from 1-20 carbon atoms such as ethyl, methyl, propyl, n-butyl, iso-butyl and the like. Preferably the solid is prepared by contacting $TiCl_4$ with the six to one complex of n-butylethylmagnesium with triethyl aluminum to provide a $TiCl_3$ complex represented by $7TiCl_3 \cdot AlMg_6nBu_3Et_5Cl_7$. Further illustrative examples of titanium-magnesium-aluminum alkyl complexes which can be usefully employed in accordance with their invention and their preparation of such complexes are described in U.S. Pat. Nos. 4,027,089, 4,004,071, 3,989,878 and 4,159,965 which disclosures are incorporated herein in their entirety.

The transition metal halides can be contained on a magnesium dichloride support. For example, magnesium dihalides can be ball-milled with a titanium tetrachloride in the presence of a Lewis base and thereafter contacted with an aluminum trialkyl-Lewis base complex.

The organoaluminum compound employed in accordance with this invention is isoprenylaluminum.

Isoprenylaluminum is produced by the reaction of isoprene(2-methyl-1,3-butadiene) with triisobutyl aluminum or diisobutyl aluminum hydride to form a viscous product having the approximate empirical formula $(isoC_4H_9)_xAl(C_5H_{10})_y$ wherein $y/x \geq 2$ and containing typically 14.0 to 15.0% aluminum. The methods and conditions for preparing isoprenylaluminum are disclosed in U.S. Pat. No. 3,149,136 of Bruce et al, issued Sept. 15, 1964. A further description of isoprenylaluminum can be found in the review by J. J. Ligi and D. B. Malpass' "Encyclopedia of Chemical Processing and Design", (J. J. McKetta and W. A. Cunningham, editors), Marcel Dekker, New York, N.Y., Vol. 3, p. 1 (1977) and references cited therein.

The molar ratio of the polar halogenated hydrocarbon to aluminum contained in isoprenylaluminum can be in the range of about 0.1:1 to about 10:1 and preferably 0.3:1 to about 4.0:1. Greater or lesser amounts can be employed. The molar ratio of aluminum contained in isoprenylaluminum to the transition metal compound can be in the range of about 10:1 to about 100:1.

The polymerization of ethylene in the presence of the described catalyst may be carried out according to all known techniques: continuously or discontinuously, in the gaseous state, that is in the absence of any liquid medium, or in the presence of a dispersion medium in which the monomer is soluble. The dispersing mediums can be for example inert hydrocarbon, liquid under the conditions of polymerization or the monomers themselves.

The transition metal containing catalyst component may be introduced into the polymerization reactor directly or in the form of a prepolymer produced by means of preliminary polymerization of one or more olefins in the presence of the solid component comprising titanium.

The isoprenylaluminum compound may also be introduced directly into the polymerization reactor.

The halogenated hydrocarbon may be introduced into the polymerization reactor in mixture with the isoprenylaluminum; it may also be introduced into the polymerization reactor separately, in two or more batches, in the course of the polymerization operation. All three components can be introduced simultaneously. Where suitable, electron donor modifiers can be introduced with the catalyst or previously reacted with one or more of the catalyst components. Hydrogen can be employed as a chain growth limiter.

The process according to the invention may be advantageously applied to the homopolymerization of ethylene and to its copolymerization with other alpha-olefins, such as propylene, butene-1 and the like. Preferably, the catalyst system is advantageously employed in the polymerization of ethylene to linear high density polyethylene.

The polymer so obtained evidences improved properties with respect to extrusion and strength which properties can be directly attributable to the broad molecular weight distribution of the polymer product.

The broad molecular weight distribution is evidenced by the melt index ratio. In accordance with this invention, melt index ratios of polyethylene are obtained in the range of about 80 to about 130 and preferably about 85 to about 110. Such melt index ratios would represent Mw/Mn greater than 15 and generally in the range of about 15 to about 30.

The invention is further described by the following examples which illustrate the best modes presently contemplated for carrying out the present invention but which must not be construed as limiting the invention in any manner whatsoever.

In these examples MI designates a melt index of a polymer which is measured at 190° C. under a load of 2.16 Kg in accordance with ASTM D-1238. MIR designates a flow ratio represented by $MI_{21.6}/MI_{2.16}$ wherein $MI_{21.6}$ is a melt index of the polymer measured at 190° C. under a load of 21.6 Kg and $MI_{2.16}$ is the melt index meausred at 190° C. under a load of 2.16 Kg and is one of the criteria for the molecular weight distribution. A lower MIR shows a narrower molecular weight distribution.

EXAMPLES

In the examples following, the transition metal containing catalyst component was prepared by adding 30 ml of dried degassed n-heptane to a nitrogen swept 3-necked, 250 ml round bottom flask containing a magnetic stirrer. A 10.7% n-heptane solution containing 28.53 g of n-butylethyl magnesium (BEM) was introduced into the flask at room temperature followed by the introduction with stirring of a 25.2% triethyl aluminum (TEAL) solution in n-heptane containing 1.76 TEAL. The flask was maintained at room temperature for one hour with constant stirring. Into a dropping funnel containing 30 cc of n-heptane was added 6.01 g neat $TiCl_4$. The flask was cooled to $-5°$ C. and the $TiCl_4$ solution was added dropwise while stirring to the BEM/TEAL solution over a 2 hour period. The reaction vessel was allowed to warm to room temperature while constantly stirring.

EXAMPLE 1 (Control)

To an autoclave reactor there was charged sequentially 800 ml of dry hexane, 0.85 mmoles of triisobutylaluminum and 0.7 ml of catalyst slurry (1.90 grams catalyst component). The reactor was heated to 50° C. and pressured to 50 psig with hydrogen. The temperature was increased to 85° C. and ethylene was continuously introduced in order to maintain reactor pressure at 150 psig. Polymerization was continued for 40 minutes. The solvent was removed by evaporation and the polymer dried in a vacuum oven to constant weight. A total of 114 grams of polyethylene was obtained with a melt index (MI) of 0.16 dg/min and a melt index ratio (MIR) of 46. The activity of the catalyst was 68 kgPE/g Ti.HR.atmC$_2$H$_4$.

EXAMPLES 2-8 (Control)

Examples 2 through 8 were performed identically as Example 1 with the exception that the milligrams of titanium component were slightly varied. The results of the polymerizations are summarized in Table I.

TABLE I

Standard Polymerizations[a]
(Control)

| Examples | Ti Catalyst Component (mg) | Specific Activity[b] | MI (dg/min) | MIR |
|---|---|---|---|---|
| 1 | 1.90 | 68.0 | 0.16 | 46 |
| 2 | 1.83 | 73.9 | 0.21 | 43 |
| 3 | 1.83 | 72.8 | 0.21 | 42 |
| 4 | 1.86 | 70.3 | 0.18 | 47 |
| 5 | 1.86 | 67.6 | 0.20 | 41 |
| 6 | 1.85 | 72.9 | 0.37 | 43 |
| 7 | 1.90 | 78.4 | 0.31 | 38 |
| 8 | 1.90 | 73.0 | 0.12 | 47 |

[a]Conditions used for standard polymerizations were: 40 minutes at 85° C., 50 psig H$_2$ (charged at 50° C.), and 150 psig total pressure. Triisobutylaluminum (TIBAL) used as cocatalyst (Al/Ti = 45).
[b]Specific activity is expressed as kgPE/gTi · hr · atmC$_2$H$_4$; a pressure of 100 psigC$_2$H$_4$ was used in calculating specific activity.

EXAMPLES 9-18

These examples demonstrate the effects of organic halides on catalyst performance.

The same titanium catalyst conponent prepared as described above and the same polymerization procedure as employed in Example 1 was used with the exception that a small amount of an organic halide adjuvant was charged to the reactor after the cocatalyst and catalyst were introduced. The results of these experiments are summarized in Table II. The results indicate small increases in MIR values thereby indicating only slight broadening of the molecular weight distribution of the resulting polymers.

TABLE II

Effect of Organic Halides Catalyst Performance[a]
(Control)

| Example | Organic Halide (RX) Compound | mmoles | Rx/Ti | Specific Activity | MI | MIR |
|---|---|---|---|---|---|---|
| 9 | CFCl$_3$ | 0.05 | 7 | — | 0.10 | 52 |
| 10 | CFCl$_3$ | 0.11 | 14 | 25.8 | 0.05 | 72 |
| 11 | CFCl$_3$ | 1.1 | 150 | 1.4 | — | — |
| 12 | CFCl$_3$ | 1.1 | 140 | 0 | — | — |
| 13 | C$_2$H$_5$Cl | 0.84 | 110 | 53.6 | 0.07 | 52 |
| 14 | C$_2$H$_5$Cl | 1.1 | 140 | 47.9 | 0.02 | 70 |
| 15 | C$_2$H$_5$Cl | 4.7 | 590 | 35.8 | 0.03 | 66 |
| 16 | C$_2$H$_5$Cl | 8.9 | 1100 | 0 | — | — |
| 17 | C$_2$H$_9$Cl | 0.78 | 100 | 63.0 | 0.09 | 58 |
| 18 | C$_4$H$_9$Cl | 0.81 | 100 | 68.9 | 0.05 | 64 |

[a]Conditions for polymerization were identical to those of standard runs (Table I).

EXAMPLES 19-24

These examples demonstrate the effect obtained by employing organometallic compounds other than triisobutyaluminum as the cocatalyst in combination with the titanium containing catalyst component. Polymerization procedures were as described in Example 1. The organometallic compounds employed and the results are summarized in Table III. The results demonstrate that there is a slight broadening of the molecular weight distribution by employing bis(diisobutylaluminum)oxide (DIBAL-O) or isoprenylaluminum (obtained from Texas Alkyls) as a cocatalyst in place of triisobutylaluminum.

TABLE III

Effect of Various Organoaluminum Compounds on Catalyst Performance[a]
(Control)

| Example | Organoaluminum Compound (A) | mmoles (A) | A/Ti | Specific Activity | MI | MIR |
|---|---|---|---|---|---|---|
| 19 | DEAL-E | 0.35 | 46 | 0 | — | — |
| 20 | DIBAL-O | 0.47 | 59 | 50.5 | 0.08 | 58 |
| 21 | DIBAL-O | 0.88 | 99 | 50.5 | 0.34 | 43 |
| 22 | DIBAL-H | 0.35 | 45 | 49.3 | 0.29 | 41 |
| 23 | ISO-PRENYL | 0.36 | 46 | 34.1 | 0.085 | 59 |
| 24 | DEBA | 0.34 | 45 | 46.2 | 0.26 | 40 |

[a]DEAL-E - diethylaluminum ethoxide;
DIBAL-O - bis(diisobutylaluminum)oxide;
ISOPRENYL - isoprenylaluminum;
DEBA - diethylbutenylaluminum.

EXAMPLES 25-28

These examples are demonstrative of the invention.

Following the same procedure as in Examples 9-18, a series of experiments were performed with the exception that isoprenyl was employed as the cocatalyst in place of triisobutylaluminum. As in Examples 9 through 18, various organic halides were charged as adjuvants. In these experiments, hydrogen was charged to 60 psig (rather than 50 psig).

The order of addition of the catalyst system components was as follows: hexane solvent, isoprenylaluminum, titanium containing catalyst slurry and organic halide. Unlike the previous experiments, a short induction period of 3-8 minutes was observed before polymerization commenced. The results of the polymerizations are summarized in Table IV. The results clearly demonstrate a substantial broadening of the molecular weight distribution as manifested by the MIR of from about 85 to about 110.

TABLE IV

Effect of Combined Isoprenyl and Polar Modifiers on Catalyst Performance[a]

| EX. | Cocatalyst Compound | Al/Ti | Polar Compound (RX) Compound | mmoles | RX/Ti | Spec. Act. | MI | MIR |
|---|---|---|---|---|---|---|---|---|
| 25 | ISOPRENYL | 43 | CFCl$_3$ | 0.18 | 16 | 13.0 | 0.082 | 109 |
| 26 | ISOPRENYL | 45 | CFCl$_3$ | 0.15 | 13 | 17.4 | 0.032 | 107 |
| 27 | ISOPRENYL | 48 | C$_2$H$_5$Cl | 1.9 | 170 | 47.8 | 0.028 | 91 |
| 28 | ISOPRENYL | 48 | C$_4$H$_9$Cl | 1.9 | 170 | 47.8 | 0.046 | 86 |

[a]Polymerization conditions were 60 psig H$_2$ (charged at 50° C.), 150 psig total pressure for 22-28 minutes at 85° C.

Organic halide was charged as a dilute solution in hexane after cocatalyst (TIBAL) and catalyst were introduced.

EXAMPLES 29-32
(Comparative)

A series of experiments were performed identically as in 25-28 with the exception that DIBAL-O was substituted for isoprenylaluminum. The results as summarized in Table V show a lessening of the MIR values when an aluminum compound other than isoprenyl is employed in combination with the polar compounds.

TABLE V

Effect of Combined DIBAL-O and Polar Modifiers on Catalyst Performance[a]

| EX. | Cocatalyst Compound | Al/Ti | Polar Compound (RX) Compound | mmoles | RX/Ti | Spec. Act. | MI | MIR |
|---|---|---|---|---|---|---|---|---|
| 29 | DIBAL-O | 100 | $CFCl_3$ | 0.18 | 16 | 24.6 | 0.022 | 69 |
| 30 | DIBAL-O | 92 | $CFCl_3$ | 0.15 | 14 | 40.5 | 0.067 | 76 |
| 31 | DIBAL-O | 104 | $C_2H_5Cl$ | 1.3 | 150 | 38.8 | 0.072 | 64 |
| 32 | DIBAL-O | 112 | $C_2H_5Cl$ | 0.82 | 90 | 51.0 | 0.058 | 74 |

[a]Ratio of DIBAL-O to titanium; Al/Ti is 2× these numbers.

What is claimed is:

1. A process for the polymerization of ethylene comprising polymerizing ethylene in the presence of a catalyst comprising (a) a transition metal compound of a Group IVb to VIb metal,
    (b) isoprenylaluminum and
    (c) a halogenated hydrocarbon.

2. The process of claim 1 wherein the halogenated hydrocarbon is a polar halogenated hydrocarbon.

* * * * *